(12) United States Patent
Aitcin et al.

(10) Patent No.: US 11,136,019 B2
(45) Date of Patent: Oct. 5, 2021

(54) METHOD FOR MONITORING A DRIVE BELT OF A CONTINUOUSLY VARIABLE TRANSMISSION AND METHOD FOR PREVENTING DAMAGE TO THE DRIVE BELT

(71) Applicant: BOMBARDIER RECREATIONAL PRODUCTS INC., Valcourt (CA)

(72) Inventors: Xavier-Pierre Aitcin, St-Hyacinthe (CA); Bruno Schuehmacher, Richmond (CA); Marc Giguere, Magog (CA); Michel Bernier, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 16/777,920

(22) Filed: Jan. 31, 2020

(65) Prior Publication Data
US 2020/0247383 A1 Aug. 6, 2020

Related U.S. Application Data

(60) Provisional application No. 62/799,476, filed on Jan. 31, 2019.

(51) Int. Cl.
*B60W 10/06* (2006.01)
*B60W 10/107* (2012.01)
*F16H 9/04* (2006.01)

(52) U.S. Cl.
CPC .......... *B60W 10/107* (2013.01); *B60W 10/06* (2013.01); *F16H 9/04* (2013.01); *B60W 2300/43* (2013.01); *B60W 2400/00* (2013.01)

(58) Field of Classification Search
CPC .. B60W 10/06; B60W 10/107; B60W 30/184; B60W 30/1843; B60W 2300/43; B60W 2510/0638; B60W 2510/251; B60W 2510/0652; B60W 2510/0666; B60W 2510/08; B60W 2510/082; B60W 2510/085; F16H 9/04
See application file for complete search history.

(56) References Cited

U.S. PATENT DOCUMENTS

| 7,380,538 | B1* | 6/2008 | Gagnon | ................. B60K 31/04 123/403 |
|---|---|---|---|---|
| 7,484,482 | B1 | 2/2009 | Mayringer | |
| 7,762,220 | B2 | 7/2010 | Okanovic et al. | |
| 9,945,479 | B2* | 4/2018 | Roland | ..................... F16H 9/14 |

(Continued)

*Primary Examiner* — Edwin A Young
(74) *Attorney, Agent, or Firm* — BCF LLP

(57) ABSTRACT

Monitoring is provided for a drive belt of a continuously variable transmission (CVT) mounted in a vehicle having a motor driving the CVT. A rotational speed of the motor and a power level of the motor are sensed. An abuse indicator for the drive belt is set when, concurrently, the rotational speed of the motor increases at a rate that exceeds a change threshold and the power level of the motor exceeds a power threshold. A level of abuse of the drive belt is calculated based on a speed of the vehicle and on a drive belt temperature. Damage to the drive belt may be prevented by limiting a power output of the motor when an accumulated level of abuse exceeds an abuse threshold. A vehicle having an electronic control unit configured to perform the method is also disclosed.

19 Claims, 9 Drawing Sheets

(56) References Cited

U.S. PATENT DOCUMENTS

| | | | |
|---|---|---|---|
| 2002/0123836 A1* | 9/2002 | Komiyama | B60K 6/48 |
| | | | 701/51 |
| 2003/0136594 A1* | 7/2003 | Kusase | B60L 15/025 |
| | | | 180/65.245 |
| 2009/0143191 A1* | 6/2009 | Hubbard | B60W 30/1882 |
| | | | 477/43 |

* cited by examiner

METHOD FOR MONITORING A DRIVE BELT OF A CONTINUOUSLY VARIABLE TRANSMISSION AND METHOD FOR PREVENTING DAMAGE TO THE DRIVE BELT

CROSS-REFERENCE

The present application claims priority from U.S. provisional patent application Ser. No. 62/799,476, filed on Jan. 31, 2019, the disclosure of which is incorporated by reference herein.

FIELD OF TECHNOLOGY

The present technology relates to methods for monitoring a drive belt of a continuously variable transmission and to methods for preventing damage to the drive belt.

BACKGROUND

Many vehicles use a continuously variable transmission (CVT) to transmit power from a motor to the ground engaging members. A CVT includes a drive pulley, a driven pulley, and a drive belt looped around the pulleys. The motor drives the drive pulley, which drives the belt, which drives the driven pulley, which then drives one or more ground engaging members, typically via other mechanical components provided between the driven pulley and the ground engaging members. These ground engaging members may include wheels or, in the case of a snowmobile, a drive track.

Each of the pulleys have a movable sheave and a fixed sheave. As the movable sheave of a given pulley moves closer to the fixed sheave, the drive belt is pushed to turn about a greater radius about the pulley, and the pulley is said to have a greater effective diameter. Similarly, as the movable sheave moves away from the fixed sheave, the drive belt moves to turn about a smaller radius about the corresponding pulley, and the pulley is said to have a smaller effective diameter. During operation, as the speed of the motor increases, the effective diameter of the drive pulley increases and the effective diameter of the driven pulley decreases. Similarly, as the speed of the motor decreases, the effective diameter of the drive pulley decreases and the effective diameter of the driven pulley increases.

When the motor is under a heavy load, such as when travelling uphill or when towing a load, the effective diameter of the drive pulley decreases and the effective diameter of the driven pulley increases.

Many drive belts of CVTs are made of a polymer that wears due to friction, tension and deformation. During operation of the CVT, a given portion of the drive belt will experience tension, compression and bending as the drive belt rotates around the pulleys. As the drive belt rubs against the sheaves as their effective diameters change, the drive belt can slip relative to the pulleys and the drive belt can be squeezed and deform between the sheaves of the pulleys. Also, when the belt turns about the pulleys, the material of the belt gets compressed on the inside and stretches on the outside, and this effect increases as the effective diameter of the pulleys decreases. All of this leads to wear of the drive belt. For this reason, vehicle manufacturers typically recommend changing the drive belt after a certain number of kilometers traveled by the vehicle, a certain number of hours of operation of the vehicle or a combination thereof.

However, the vehicle's operating conditions, such as the way in which the driver operates the vehicle and/or other environmental conditions in which the vehicle operates may significant reduce the lifetime of a drive belt. For example, a driver who accelerates quickly from a low speed will cause more wear to the drive belt than another driver who operates the vehicle at constant speed for long periods of time. Some drive belts, such as polymer belts for instance, will wear faster in a hot environment than in a cold environment. Abuse of the capabilities of the vehicle may cause premature wear of and/or damage to the drive belt. Moreover, abusive driving habits may cause a rapid increase in the temperature of the drive belt, which then becomes even more prone to damage.

Therefore, there is a desire for a method for monitoring and for preventing damage to the drive belt of a CVT that takes into account the vehicle's operating conditions.

SUMMARY

It is an object of the present technology to ameliorate at least some of the inconveniences present in the prior art.

The present technology provides a method for monitoring a drive belt of a continuously variable transmission (CVT) and a method for preventing, mitigating and/or delaying damage to the drive belt. Operational parameters of a vehicle equipped with the CVT, for example a snowmobile, are sensed. Conditions that may be characterized as abusive are detected and, if maintained over time, cause the display of abuse indications that are detectable by a rider of the vehicle. If the abusive conditions are still maintained, a power output of a motor of the vehicle may be limited in order to prevent damage to the drive belt. Sensed operational parameters may include one or more of a rotational speed of the motor, a power level of the motor, a temperature of the drive belt, and a speed of the vehicle.

According to a first aspect of the present technology, there is provided a method for monitoring a drive belt of a continuously variable transmission (CVT) provided in a vehicle having a motor driving the CVT, the method comprising: sensing a rotational speed of the motor; sensing a power level of the motor; and setting an abuse indicator for the drive belt when, concurrently, the rotational speed of the motor increases at a rate that exceeds a change threshold, and the power level of the motor exceeds a power threshold.

In some embodiments of the present technology, the method further comprises: sensing a speed of the vehicle; the abuse indicator being set when, concurrently, the rotational speed of the motor increases at a rate that exceeds the change threshold, the speed of the vehicle is lower than a speed threshold and the power level of the motor exceeds the power threshold.

In some embodiments of the present technology, the method further comprises: if the abuse indicator is not set, setting an adjusted abuse indicator equal to a null value; and if the abuse indicator is set: determining a severity factor based on the speed of the vehicle, and setting the adjusted abuse indicator equal to the severity factor.

In some embodiments of the present technology, the speed threshold is a first speed threshold; the severity factor has a minimum value when the speed of the vehicle exceeds the first speed threshold; and the severity factor has a maximum value when the speed of the vehicle is less than or equal to a second speed threshold lower than the first speed threshold.

In some embodiments of the present technology, the method further comprises: sensing a temperature of the drive belt using a sensor adapted for sensing a surface temperature of the drive belt or using a sensor adapted for sensing an ambient temperature within a housing of the CVT; determining a wear factor of the drive belt based on the temperature of the drive belt; and calculating a level of abuse for the drive belt by multiplying the adjusted abuse indicator by the wear factor of the drive belt.

In some embodiments of the present technology, the wear factor has a minimum value when the temperature of the drive belt is less than or equal to a temperature threshold; and when the temperature of the drive belt exceeds the temperature threshold, the wear factor increases as a function of the temperature of the belt up to a maximum value.

In some embodiments of the present technology, the method further comprises providing a visible or audible high drive belt temperature indication when the temperature of the drive belt exceeds the temperature threshold.

In some embodiments of the present technology, the method further comprises recording every instance of the drive belt exceeding the temperature threshold.

In some embodiments of the present technology, the method further comprises: detecting a new abuse event for the drive belt; recording information about the new abuse event for the drive belt; and calculating a short-term accumulated level of abuse by summing values for the level of abuse for new abuse events detected over a first predetermined period ending when a most recent abuse event is detected.

In some embodiments of the present technology, the method further comprises providing a visible or audible drive belt abuse indication when the short-term accumulated level exceeds a short-term abuse threshold.

In some embodiments of the present technology, the method further comprises calculating a long-term accumulated level of abuse by summing values for the level of abuse for new abuse events detected over a second predetermined period ending when the most recent abuse event is detected, the second predetermined period being longer than the first period.

According to a second aspect of the present technology, there is provided a method of preventing damage to a drive belt of a continuously variable transmission (CVT) provided in a vehicle having a motor driving the CVT, the method comprising: monitoring the drive belt using the method for monitoring the drive belt of the CVT; and limiting a power output of the motor when the long-term accumulated level of abuse exceeds a long-term abuse threshold.

In some embodiments of the present technology, the method further comprises: periodically evaluating the abuse indicator, the abuse indicator being reset when, upon each evaluation, at least one of the following conditions is met: the rate of increase of the rotational speed of the motor is less than or equal to the change threshold, and the power level of the motor is less than or equal to the power threshold; recording each value obtained by periodically evaluating the abuse indicator; and calculating an accumulated level of abuse by summing successively recorded values for the abuse indicator over a predetermined period ending when a most recent value is recorded.

According to a third aspect of the present technology, there is provided a method of preventing damage to a drive belt of a continuously variable transmission (CVT) provided in a vehicle having a motor driving the CVT, the method comprising: monitoring the drive belt using the method for monitoring the drive belt of the CVT; and limiting a power output of the motor when the accumulated level of abuse exceeds an abuse threshold.

In some embodiments of the present technology, the method further comprises: periodically evaluating the abuse indicator, the abuse indicator being reset when, upon each evaluation, at least one of the following conditions is met: the rate of increase of the rotational speed of the motor is less than or equal to the change threshold, the speed of the vehicle meets or exceeds the speed threshold, and the power level of the motor is less than or equal to the power threshold; for each successive value obtained by periodically evaluating the abuse indicator, setting a corresponding successive value for the adjusted abuse indicator based on the speed of the vehicle at the time of each evaluation; recording each successive value for the adjusted abuse indicator; and calculating an accumulated level of abuse by summing successively recorded values for the adjusted abuse indicator over a predetermined period ending when a most recent value is recorded.

In some embodiments of the present technology, the method further comprises providing a visible or audible power limiting indication when limiting the power of the motor.

In some embodiments of the present technology, the motor is an internal combustion engine; and limiting the power output of the motor comprises performing at least one action selected from closing at least in part an exhaust valve of the engine, reducing a fuel supply to the engine, cutting at least in part ignition to the engine, reducing at least in part an opening of an engine throttle, and a combination thereof.

In some embodiments of the present technology, the method further comprises recording each instance when limiting the power of the motor.

In some embodiments of the present technology, the motor is an internal combustion engine; and sensing the power level of the motor comprises sensing a position of an exhaust valve of the engine.

In some embodiments of the present technology, the motor is an internal combustion engine; and sensing the power level of the motor comprises sensing a pressure at an air intake of the engine.

In some embodiments of the present technology, the motor is an internal combustion engine; and sensing the power level of the engine comprises: sensing a position of an engine throttle, and calculating the power level as a function of the position of the engine throttle and of the rotational speed of the engine.

According to a fourth aspect of the present technology, there is provided a vehicle comprising: a frame; a seat connected to the frame; a motor connected to the frame; at least one ground engaging member operatively connected to the motor; a continuously variable transmission (CVT) having a housing, the CVT operatively connecting the motor to the at least one ground engaging member, the CVT comprising, within the housing: a drive pulley operatively connected to the motor, a driven pulley operatively connected to the at least one ground engaging member, and a drive belt looped around the drive pulley and the driven pulley; a motor speed sensor for sensing a parameter indicative of a rotational speed of the motor; a sensor for sensing an operating parameter indicative of a power of the motor and an electronic control unit (ECU), comprising: a processor communicating with the sensor of the rotation speed of the motor, and with the sensor for sensing the operating parameter indicative of the power of the motor; and a non-transitory computer-readable medium having stored thereon machine executable instructions for performing, when executed by the processor, the method for monitoring the drive belt of the CVT.

In some embodiments of the present technology, the vehicle further comprises: a vehicle speed sensor for sensing a speed of the vehicle, the vehicle speed sensor communicating with the processor; the processor being configured to set the abuse indicator when, concurrently, the rotational speed of the motor increases at a rate that exceeds the change threshold, the speed of the vehicle is lower than a speed threshold and the power level of the motor exceeds the power threshold.

In some embodiments of the present technology, the vehicle further comprises a display cluster adapted for providing a visible or audible drive belt abuse indication when the abuse indicator is set.

In some embodiments of the present technology, the motor is an internal combustion engine; the sensor for sensing the operating parameter indicative of the power of the motor comprises an exhaust valve position sensor for sensing a position of an exhaust valve of the engine, the exhaust valve position sensor communicating with the processor; and the processor is further configured to determine the power level based on a sensed position of the exhaust valve of the engine.

In some embodiments of the present technology, the motor is an internal combustion engine; the sensor for sensing the operating parameter indicative of the power of the motor comprises an air intake pressure sensor for sensing air pressure in an air intake of the engine, the air intake pressure sensor communicating with the processor; and the processor is further configured to determine the power level based on a sensed air pressure of the air intake of the engine.

In some embodiments of the present technology, the motor is an internal combustion engine; the sensor for sensing the operating parameter indication of a power of the motor comprises a throttle position sensor for sensing a position of an engine throttle valve, the throttle position sensor communicating with the processor; and the processor is further configured to calculate the power level as a function of the position of the engine throttle and of the rotational speed of the engine.

In some embodiments of the present technology, the vehicle further comprises a drive belt temperature sensor for sensing a temperature of the drive belt, the drive belt temperature sensor communicating with the processor.

In some embodiments of the present technology, the sensor of the temperature of the drive belt comprises an infrared sensor adapted for sensing a surface temperature of the drive belt.

In some embodiments of the present technology, the sensor of the temperature of the drive belt comprises a sensor adapted for sensing an ambient temperature within the housing of the CVT.

In some embodiments of the present technology, the vehicle is a snowmobile comprising a pair of front skis; and the ground engaging member is an endless drive track.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The present technology will be described with respect to a snowmobile. However, it is contemplated that the present technology could be applied to other vehicles equipped with a continuously variable transmission (CVT), including without limitation a car, a motorcycle, a three-wheeled straddle type vehicle, an all-terrain vehicle, and an off-road side-by-side vehicle. Application of the present technology is therefore not intended to be limited to its use in snowmobiles. Also, although several of the examples and drawings presented herein refer to the use of an internal combustion engine to propel a snowmobile, the present technology could be applied to snowmobiles or to other vehicles equipped with an electric motor powered by a battery.

The present technology intends to detect abuse of the CVT, and more particularly abuse of a drive belt of the CVT by a rider of the snowmobile 10. The present technology also intends to prevent or at least mitigate negative impacts of abuse on the drive belt of the CVT. In this context, an abuse event may be detected under conditions of high motor acceleration and power, particularly from a low vehicle speed.

Figure 1:
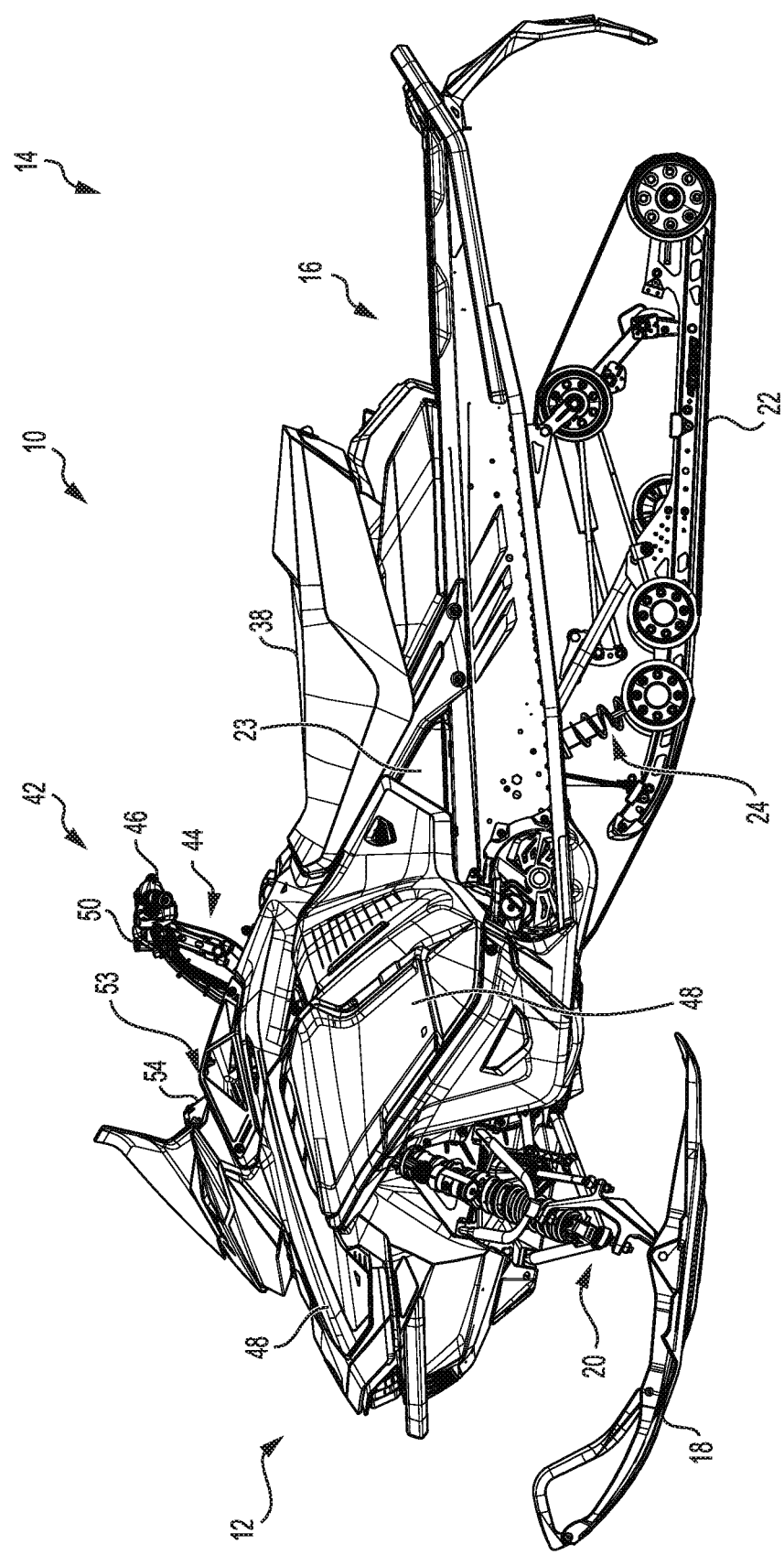
FIG. 1 is a left side elevation view of a snowmobile.

With reference to FIG. 1, a snowmobile 10 has a front end 12 and a rear end 14 defined consistently with a forward travel direction of the snowmobile 10. The snowmobile 10 has a frame 16. A pair of front skis 18 is mounted to the frame 16 by front suspension assemblies 20. A ground engaging member, for example a drive track 22 in the case of the snowmobile 10, is mounted to the frame 16 by a rear suspension assembly 24. The front skis 18 are disposed equidistant from a longitudinal centerline of the snowmobile 10, and the drive track 22 is centered with respect to the longitudinal centerline.

The snowmobile 10 has a laterally centered straddle seat 38 mounted to the frame 16. In the illustrated embodiment, the straddle seat 38 is intended to accommodate one or two adult-sized riders, i.e. the driver and a passenger. The snowmobile 10 also includes a number of fairings 48, only some of which have been labeled in FIG. 1 for clarity. The fairings 48 are connected to the frame 16 to enclose and protect internal components of the snowmobile 10 such as an engine 52 or another motor.

A handlebar 42, which is part of a steering assembly 44, is disposed in front of the seat 38. The handlebar 42 is used by the driver to turn the front skis 18 to steer the snowmobile 10. A brake operator 46, in the form of a hand-operated lever, is mounted on the handlebar 42 for braking the snowmobile 10. A throttle operator 50 of the snowmobile 10 is provided as a thumb-operated or finger-operated lever on the handlebar 42. The throttle operator 50 is pivoted by the driver to control power delivered by the engine 52 of the snowmobile 10. It is contemplated that the throttle operator 50 could be in the form of a rotatable right hand grip. The handlebar 42 has connected thereto various controls (not shown) such as an engine start-up button and an engine cut-off switch located laterally inwardly of left and right hand grips. A display cluster 54 is provided forwardly of the handlebar 42. The display cluster 54 provides information to the driver of the snowmobile 10 such as speed of the snowmobile 10, engine speed, fuel level, and other notifications and warnings, such as vehicle maintenance related notifications.

The frame 16 supports and houses the engine 52 which is located forwardly of the straddle seat 38. In the illustrated embodiment illustrated on FIGS. 2 and 3, the engine 52 is an inline, two-cylinder, two-stroke internal combustion engine, but could be a four-stroke or diesel internal combustion engine. It is also contemplated that the engine 52 could have more or less cylinders. It is also contemplated that the engine 52 could have cylinders arranged in a configuration other than inline.

The engine 52 is operatively connected to the drive track 22 via an engine output shaft (not shown), a continuously variable transmission (CVT) 58, and a reduction drive (not shown). As can be seen, the CVT 58 is disposed on the left side of the engine 52.

The engine 52 has a crankcase 102, a cylinder block 104 disposed on and connected to the crankcase 102, and a cylinder head assembly 106 disposed on and connected to the cylinder block 104. A crankshaft (not shown) is housed in the crankcase 102. The cylinder block 104 defines two (2) cylinders (not shown). A piston (not shown) is disposed inside each cylinder for reciprocal movement therein. The lower end of each piston is linked by a connecting rod (not shown) to the crankshaft. A combustion chamber is defined in the upper portion of each cylinder by the walls of the cylinder, the cylinder head assembly 106 and the top of the piston. Explosions caused by the combustion of an air/fuel mixture inside the combustion chambers cause the pistons to reciprocate inside the cylinders. The reciprocal movement of the pistons causes the crankshaft to rotate, thereby allowing power to be transmitted from the crankshaft to the drive track 22 via the CVT 58 and the reduction drive. The cylinder head assembly 106 includes a fuel injector 118 for each cylinder. The fuel injectors 118 receive fuel from a fuel tank 23 of the snowmobile 10. A spark plug (not shown) is provided in the cylinder head assembly 106 for each cylinder to ignite the air/fuel mixture in each cylinder. Exhaust gases resulting from the combustion of the air-fuel mixture in the combustion chamber are removed from the engine 52 and are then released to the atmosphere via exhaust ports 112 of the engine 52. An exhaust system includes an exhaust manifold 56, connected to a front of the engine 52 to receive exhaust gas from the exhaust ports 112, and a muffler (not shown) to receive exhaust gas from the exhaust manifold 56. The illustrated engine 52 being a two-stroke engine, the exhaust system may include actuated exhaust valves 111 in fluid communication with the exhaust ports 112. The exhaust valves are controlled by a motor 108 and an actuator 110 driven by the motor 108 via a cable 114 to restrict a flow of exhaust gases when the engine 52 is operating at low or medium speeds and to allow an unrestricted flow of exhaust gases when the engine 52 is operating at high speeds. Although in the present embodiment the actuator 110 is an electrical exhaust valve actuator, it is contemplated that other types of exhaust valve actuators could be used. For example, it is contemplated that the actuator 110 described herein could be replaced by two pneumatic valve actuators similar to those described in U.S. Pat. No. 7,484,482, issued Feb. 3, 2009, and U.S. Pat. No. 7,762,220, issued Jul. 27, 2010, the entirety of both of which is incorporated herein by reference.

The engine 52 receives air from an air intake system that includes an air intake assembly 53. The air intake assembly is disposed in part behind the engine 52 (hidden in FIGS. 2 and 3). The air intake assembly includes a throttle body (not shown) and an air intake manifold (not shown) and also includes a number of features such as internal walls and an air filter to help prevent the entry of dust and water into the engine 52. The throttle body includes a throttle valve (not shown) actuated by a throttle motor (not shown) to control a flow of air to the engine 52. The air intake manifold is connected to the engine 52 and defines two outlets (one per cylinder) to supply air to the air intake ports (not shown) of the engine 52. During operation, air flows into the air intake assembly through the throttle body, then through the air intake manifold and finally to the combustion chambers of the engine 52.

An end of the crankshaft forms an engine output shaft that extends leftwardly from the left end of the crankcase 102 to operatively connect the crankshaft to the CVT 58. It is contemplated that a separate engine output shaft could be operatively connected to the crankshaft, either directly or via one or more gears, and be further connected to the CVT 58. It is further contemplated that the engine output shaft could be connected to the CVT 58 via a transfer case.

The CVT 58 includes a CVT housing 130 disposed to the left of the engine 52. A part of a drive pulley 132 and of a drive belt 136 are visible underneath a lower portion of the CVT housing 130. A left portion of the CVT housing 130 is further removed in FIG. 3 to provide a better view of the drive pulley 132 and to show a driven pulley 154. The drive belt 136 is looped around the drive pulley 132 and the driven pulley 134 for driving the driven pulley 134 when the drive pulley 132 is entrained by the engine 52. The pulleys 132, 134 and the drive belt 136 are disposed inside the CVT housing 130. In a non-limiting embodiment, the drive belt 136 is made of a polymer, such as rubber for example.

The drive pulley 132 is mounted to the left end of the crankshaft extending leftwardly from the crankcase 102 so as to rotate therewith. The drive pulley 132 is disposed in a lower portion of the CVT housing 130. The driven pulley 134 is mounted on the left end of a shaft 142. The driven pulley 134 is disposed above the drive pulley 132 in the illustrated embodiment of the snowmobile 10. It is however contemplated that the driven pulley 134 could be disposed in a different position with respect to the drive pulley 132. It is contemplated that the driven pulley 134 could be disposed lower than the drive pulley 132, for example, if the drive pulley 132 was connected to the crankshaft indirectly instead of directly as shown herein. The shaft 142 is operatively connected to the drive track 22 in order to transmit to the drive track 22 a power output of the engine 52 via the CVT 58.

In the CVT 58, the drive pulley 132 includes a movable sheave 150 that can move axially relative to a fixed sheave 152 to modify an effective diameter of the drive pulley 132. The moveable sheave 150 has centrifugal weights (not shown) that push the movable sheave 150 relative to the fixed sheave 152 as the speed of rotation of the drive pulley 132 increases such that the effective diameter of the drive pulley 132 increases. Similarly, the driven pulley 134 includes a movable sheave 157 that can move axially relative to a fixed sheave 156 to modify an effective diameter of the driven pulley 134. The effective diameter of the driven pulley 134 is in inverse relationship to the effective diameter of the drive pulley 132. The movable sheaves of the drive pulley 132 and of the driven pulley 134 are on opposite sides of the drive belt 136.

Figure 2:
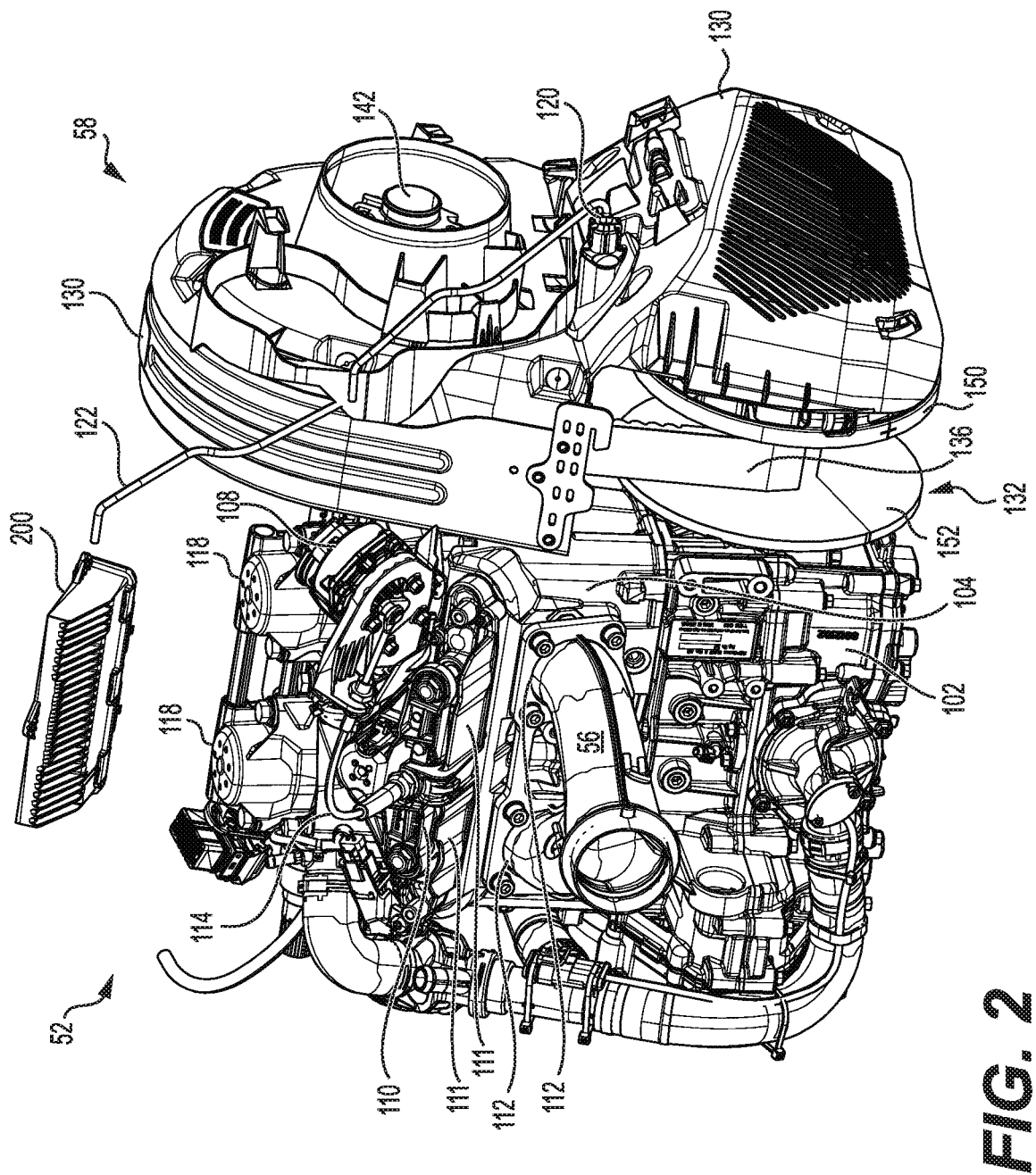
FIG. 2 is a perspective view taken from a front, left side of an engine and a continuously variable transmission (CVT) of the snowmobile of FIG. 1.
Figure 3:
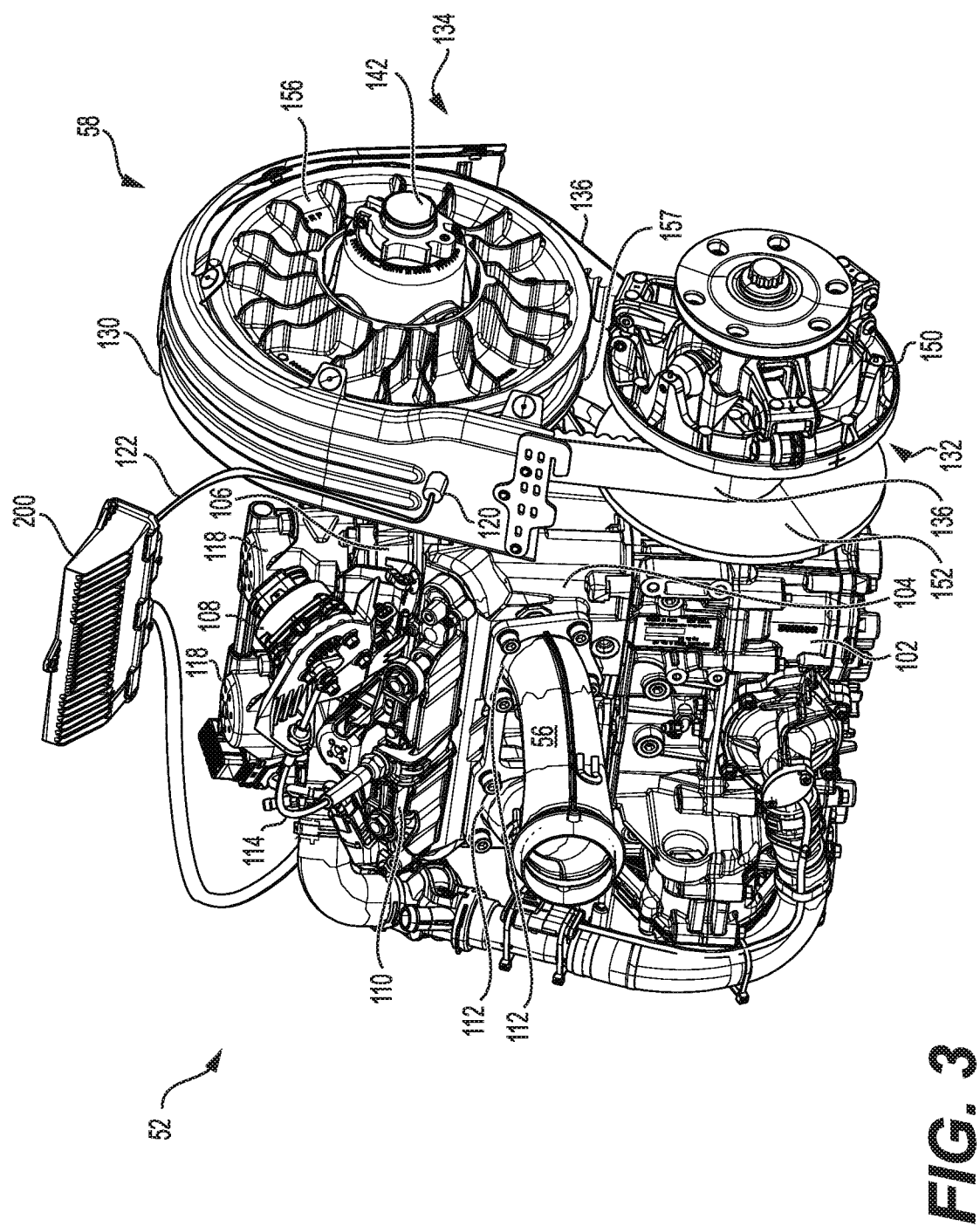
FIG. 3 is another perspective view taken from a front, left side of the engine and CVT of FIG. 2 in which both drive and driven pulleys are exposed.

A drive belt temperature sensor 120 is provided to monitor a temperature of the drive belt 136. FIG. 2 shows a first example of a position of the drive belt temperature sensor 120, on a left side of the CVT housing 130. FIG. 3 shows a second example of a position of the drive belt temperature sensor 120, on a front side of the CVT housing 130. In both examples, the drive belt temperature sensor 120 may comprise an infrared sensor adapted for sensing a surface temperature of the drive belt 136 or a sensor of an ambient temperature within the CVT housing 130. As such, the drive belt temperature sensor 120 may directly sense the temperature of the drive belt 136. Alternatively, the drive belt temperature sensor 120 may sense the ambient temperature within the CVT housing 130 to indirectly reflect the temperature of the drive belt 136. Use of various types of temperature sensors, such as thermistors, thermocouples and resistive temperature detectors, is also contemplated.

Figure 4:
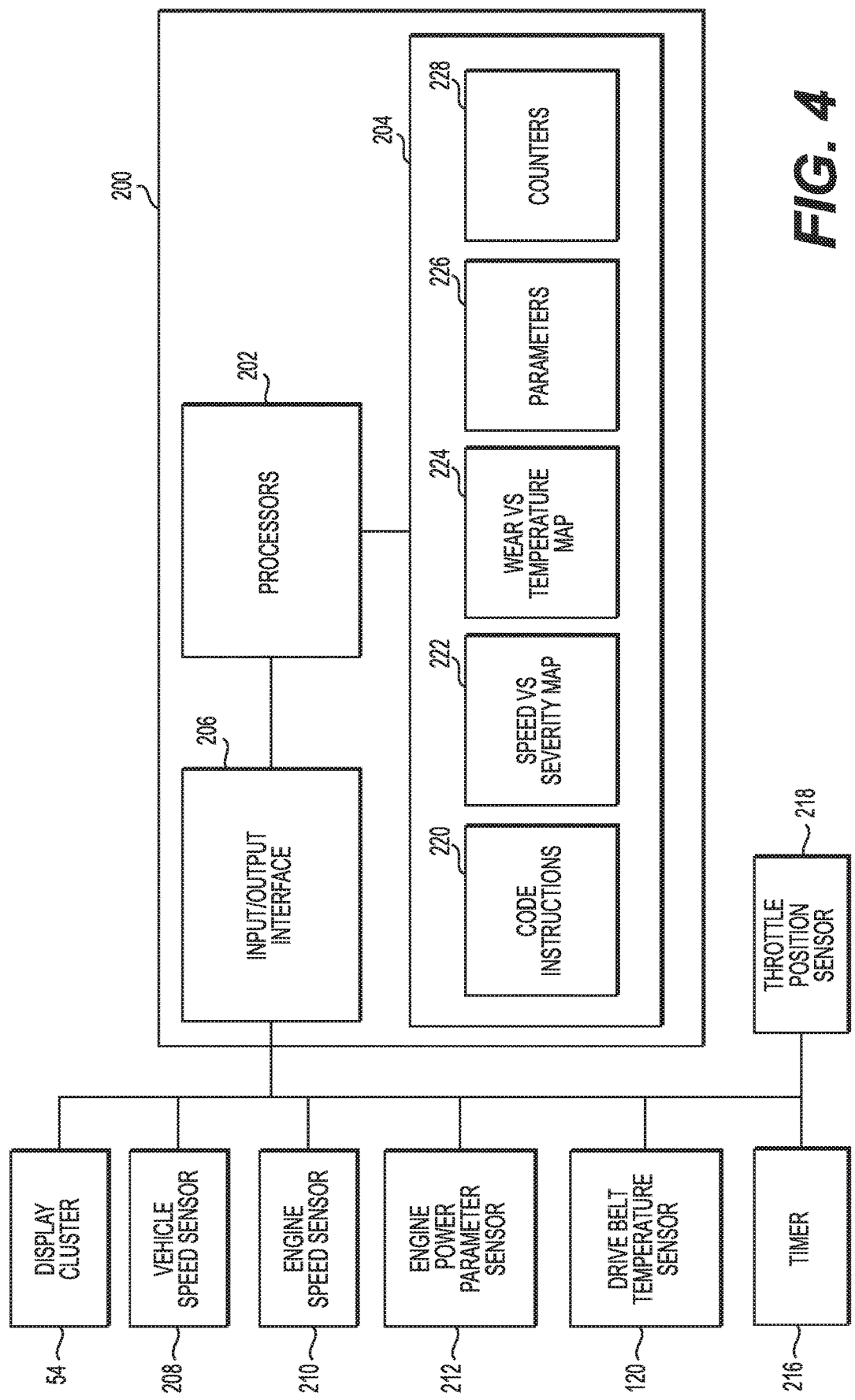
FIG. 4 is a block diagram of an engine control unit and its interconnections to electronic components of the snowmobile of FIG. 1.

The snowmobile 10 includes an electronic control unit (ECU) 200 in communication with various sensors and electronic components. As illustrated on FIGS. 2 and 3, the ECU 200 is connected to the connector 120 for the drive belt temperature sensor 120 via a cable 122. Turning now to FIG. 4, various electronic components of the snowmobile 10 will be described. The ECU 200 comprises a processor 202, a memory 204 and an input/output interface 206 allowing the ECU 200 to communicate with the electronic components of the snowmobile 10, including the display cluster 54, a vehicle speed sensor 208, a motor speed sensor 210, a sensor 212 for sensing an operating parameter indicative of a power of the engine 52, the drive belt temperature sensor 120 connected to the ECU 200 via the cable 122, and a timer 216. In an embodiment, the timer 216 may be integrated within the ECU 200. The input/output interface 206 may be implemented as one or more devices such as input devices, output devices and/or input/output devices.

The motor speed sensor 210 may be an engine speed sensor 210 when the motor is the engine 52. The engine speed sensor 210 senses a parameter indicative of a rotational speed of the engine. In particular, the engine speed sensor 210 may sense the rotational speed of the crankshaft, or a rotational speed of any other component that rotates in synchrony with the crankshaft, in which case the engine speed sensor 210 or the ECU 200 is adapted to account for a speed ratio between that other component and the crankshaft. When the motor is an electric motor, the motor speed sensor 210 may for example sense a rotational speed of a rotor of the electric motor.

Various types of the sensor 212 for sensing the operating parameter indicative of the power of the engine 52 may be contemplated. In an embodiment, the sensor 212 for sensing the operating parameter indicative of the power of the engine 52 comprises an exhaust valve position sensor and the processor 202 determines the power level based on a sensed position of the exhaust valve or valves of the engine 52. In another embodiment, the sensor 212 for sensing the operating parameter indicative of the power of the engine 52 comprises an air intake pressure sensor and the processor 202 determines the power level based on a sensed pressure of the air intake of the engine 52. In yet another embodiment, the sensor 212 for sensing the operating parameter indicative of the power of the engine 52 comprises a throttle position sensor 218 and the processor calculates the power level as a function of the position of the engine throttle and of the rotational speed of the engine 52, which is supplied by the motor speed sensor 210. These example embodiments of the sensor 212 for sensing the operating parameter indicative of the power of the engine 52 are for illustration purposes and do not limit the present disclosure.

The memory 204 may for example be a hard drive or a flash drive. The memory 204 includes a non-transitory computer-readable medium 220 that stores machine executable instructions that are executable by the processor 202. The memory 204 also includes a map 222 that contains data about a severity of potential abuse of the drive belt 136 as a function of a speed of the snowmobile 10 and a map 224 that contains data about an impact of a temperature of the drive belt 136 on potential wear of the drive belt 136. The processor 202 may use various parameters, such as various thresholds, read from the memory 204 in a list 226 of parameters, to compute various functions, described hereinbelow. The list 226 of parameters may also store information used by the processor 202 to calculate the power level of the engine 52 based on readings provided by any one of the above described embodiments of the sensor 212 for sensing the operating parameter indicative of the power of the engine 52. The processor may store results from various computations in a list 228 of counters that is part of the memory 204.

It is contemplated that the memory 204 may be implemented as a storage unit external to the ECU 200. It is also contemplated that the memory 204 could be split into multiple memory devices and/or storage units. Similarly it is contemplated that the functions of the ECU 200 could be split between multiple ECUs or that the ECU 200 could include a plurality of processors.

Based on information received from at least some of the various sensors communicating with the ECU 200, the processor 202 executes some of the machine executable instructions stored in the non-transitory computer-readable medium 220 to control the operation of the fuel injectors 118, the spark plugs and the throttle body in order to control an engine torque output by the engine 52 and in order to control a speed and acceleration of the snowmobile 10. The processor 202 also executes some other machine executable instructions stored in the non-transitory computer-readable medium 220 to execute methods for monitoring the drive belt 136 and for preventing damage to the drive belt 136, these methods being described in details hereinbelow.

Figure 5:
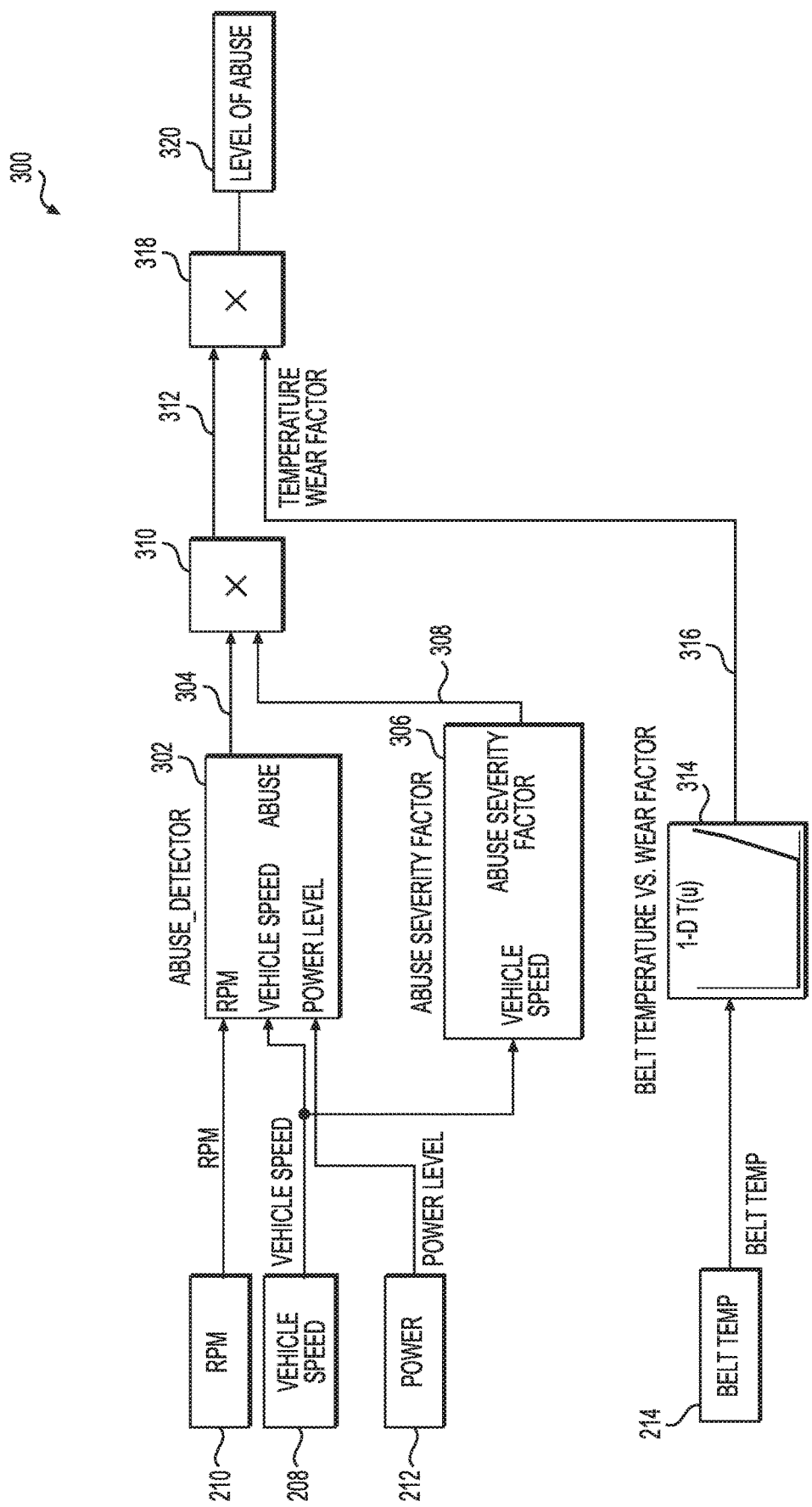
FIG. 5 is a block diagram illustrating a method for monitoring the CVT of FIG. 2.

Referring now to FIG. 5, a block diagram illustrates an embodiment of an abuse detection method for the CVT 58 and, more particularly, a detector 300 of an abuse of the drive belt 136. An abuse detection block 302 is provided with inputs from various sensors of the snowmobile 10 (or of another vehicle that implements the present technology). One such input is a rotational speed of the engine 52, expressed in revolutions per minute (RPM), provided to the abuse detection block 302 by the motor speed sensor 210. Another input represents a power level of the engine 52, provided by the sensor 212 for sensing the operating parameter indicative of the power of the engine 52. An optional further input to the detection block 302 is a vehicle speed provided by the vehicle speed sensor 208.

The abuse detection block 302 calculates a gradient, i.e. a rate of change, of the rotational speed of the engine 52 over time, expressed in RPM per second (RPM/s). The abuse detector 302 then outputs an abuse indicator 304. The abuse indicator 304 may consist of a logical value that is set when, concurrently, the rotational speed of the engine 52 increases at a rate that exceeds a change threshold and the power level of the engine 52 exceeds a power threshold. Optionally, setting the abuse indicator 304 may further require that, concurrently with the above conditions, the speed of the snowmobile 10 is lower than a first speed threshold. When at least one of these conditions is not met, the abuse indicator 304 is not set, i.e. reset to a null value.

A severity factor block 306 may compare the speed of the snowmobile 10 with a second speed threshold lower than the above-mentioned first speed threshold and determine a severity factor 308. The severity factor 308 takes a minimum value when the speed of the vehicle exceeds the first speed threshold and takes a maximum value when the speed of the vehicle is less than or equal to the second speed threshold. The severity factor 308 may vary, for example linearly, between the maximum and minimum values when the speed of the snowmobile 10 lies between the first and second speed thresholds. A first multiplier 310 multiplies the abuse indicator 304 and the severity factor 308 to yield an adjusted abuse indicator 312. In an embodiment, the abuse indicator 304 has a numerical value of zero (0) when logically reset and a numerical value of one (1) when logically set, and the first multiplier 310 multiplies this numerical value from the abuse indicator 304 and the severity factor 308 to provide the adjusted abuse indicator 312.

A temperature versus wear block 314 may apply a temperature of the drive belt 316 provided by the drive belt temperature sensor 120 to a map that provides a wear factor 316 as a function of the temperature of the drive belt 316. In an embodiment, the wear factor 316 has a minimum value when the temperature of the drive belt 316 is less than or equal to a first temperature threshold, for example 75° C. The wear factor 316 may increase linearly or nonlinearly up to a maximum value when the temperature of the drive belt 316 exceeds a second temperature threshold, for example 80° C. A second multiplier 318 multiplies the adjusted abuse indicator 312 and the wear factor 316 to yield a level of abuse 320 for the drive belt 136.

According to a non-limiting example, the abuse indicator 304 takes a value of one (1) when set and a value of zero (0) when not set. In this example, the maximum value for the severity factor 308 is one (1) and the minimum value for the severity factor 308 is one tenth (0.1). Multiplying these values in the multiplier 310, the adjusted abused indicator 312 may then be in a range of zero (0) to one (1). Still in the same example, a minimum value for the wear factor 316 is one (1) and a maximum value for the wear factor 316 is four (4). Consequently, in this example, the level of abuse 320 may be in a range of zero (0) to four (4). In this or another non-limiting example, the change threshold for the rotational speed of the engine 52 may be 6500 RPM/s, indicative of a very high acceleration of the rotational speed of the engine 52, the first speed threshold may be 60 kilometers per hour (km/h), the second speed threshold may be 40 km/h, and the power threshold may be expressed as a 60% opening of the exhaust valve or valves. In another non-limiting embodiment, the power threshold may be expressed in a range between 60 to 70 kW.

In a non-limiting embodiment, the abuse detection block 302, the severity factor 306, the temperature versus wear block 314 and the first and second multipliers 310, 318 may be implemented in the ECU 200. In this embodiment, the processor 202 executes machine executable instructions stored in the non-transitory computer-readable medium 220 to calculate the level of abuse 320. To this end, the processor 202 applies the map 222 that contains data about the severity of potential abuse of the drive belt 136 as a function of a speed of the snowmobile 10, the map 224 that contains data about the impact of the temperature of the drive belt 136 on potential wear of the drive belt 136, and the above-mentioned thresholds obtained from the list 226 of parameters.

Figure 6A:
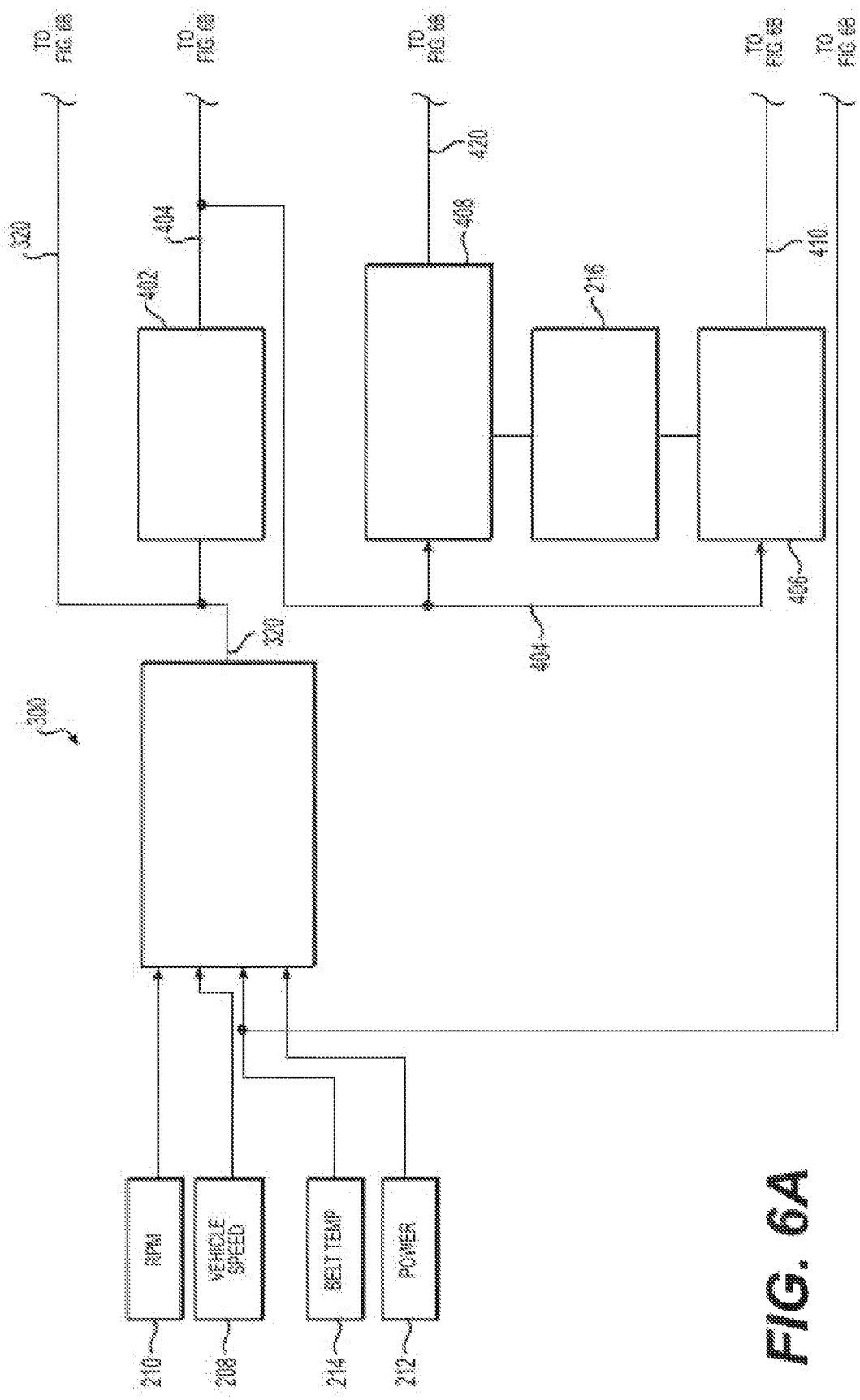
FIGS. 6A and 6B are a block diagram illustrating a method of preventing damage to the CVT of FIG. 2.
Figure 6B:
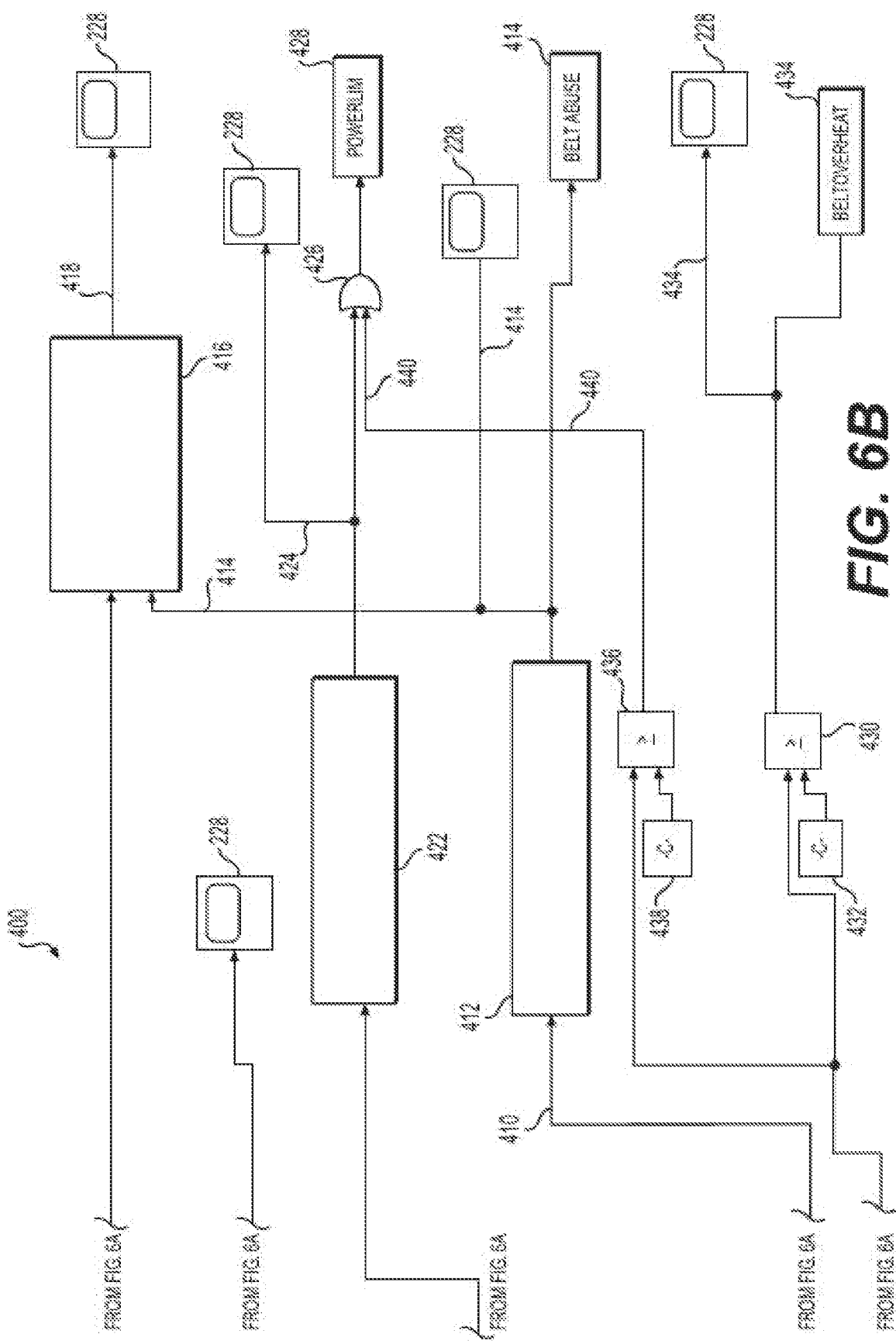

Referring now to FIGS. 6A and 6B, a block diagram illustrates an embodiment of a damage prevention method for the CVT 58 and, more particularly, a damage preventer 400 for the drive belt 136. The skilled reader will appreciate that the drive belt of any CVT will eventually wear and need to be replaced, even under normal operation conditions. The present technology is intended to mitigate and/or delay damage to the drive belt 136 that may result from abuse. In that context, the notion of damage prevention should not be understood in the absolute.

The damage preventer 400 incorporates the detector 300 of an abuse of the drive belt 136 introduced in the description of FIG. 5, whose output is the level of abuse 320 for the drive belt 136. The level of abuse 320 is applied to an abuse counter block 402 that accumulates successive values of the level of abuse 320. The abuse counter block 402 detects a new abuse event 404 when the level of abuse 320 increases above zero (0). Otherwise stated, a given abuse event 404 may last for a few seconds, following which the rider may reduce the power output demand on the engine 52, or the speed of the snowmobile 10 may increase above the first speed threshold, therefore reducing the level of abuse 320 from the detector 300 to zero (0). The abuse counter block 402 is configured to independently detect each new abuse event 404 detected based on the level of abuse 320 rising again above zero (0). The abuse counter block 402 stores information about the abuse events 404 in the list 228 of counters.

Blocks 406 and 408 accumulate information about abuse events 404. The block 406 operates over a short-term period, for example over a one-minute period, and the block 408 operations over a longer-term period, for example over a ten-minute period. Other durations for the short-term and long-term periods may be contemplated. The timer 216 provides timing information to the blocks 406 and 408.

The block 406 accumulates and sums values for the level of abuse 320, which are reflected in the abuse events 404, over the short-term term period. The block 406 calculates a short-term accumulated level of abuse 410, which is a sum of successive abuse levels 320 for distinct abuse events 404, expressed over a short-term period that ends when a most recent value for the level of abuse 320 is calculated. A block 412 compares the short-term accumulated level of abuse 410 to a short-term abuse threshold. If the short-term abuse threshold is exceeded, the block 412 causes the setting of a short-term abuse state flag 414. A visible or audible belt abuse indication is provided on the display cluster 54 when the short-term abuse state flag 414 is set. Returning to the previous example in which the level of abuse 320 may be in a range of zero (0) to four (4), the short-term abuse state flag 414 may be set and the visible or audible belt abuse indication may be provided on the display cluster 54 when the short-term accumulated level of abuse 410 reveals that the sum of successive abuse levels 320 for the distinct abuse events 404 exceeds a short-term abuse threshold of 15 in a one-minute period. The list 228 of counters stores a number of instances of setting the short-term abuse state flag 414. The short-term abuse state flag 414 may be reset or cleared when the short-term accumulated level of abuse 410 falls below the short-term abuse threshold.

The short-term abuse state flag 414 and the level of abuse 320 are also applied to a block 416. The block 416 issues an advanced abuse flag 418 when, concurrently, the short-term abuse state flag 414 is set (thus the visible or audible abuse indication is provided on the display cluster 54) and there is still a measurable level of abuse 320 of the drive belt 136 by the operator. The advanced abuse flag 418 may be understood as an indication that the rider of the snowmobile 10 is ignoring the visible or audible abuse indication. The advanced abuse flag 418 may be recorded in the list 228 of counters.

In similar fashion, the block 408 accumulates and sums values for the level of abuse 320, which are reflected in the abuse events 404, over the long-term term period. The block 408 calculates a long-term accumulated level of abuse 420, which is a sum of successive abuse levels 320 for distinct abuse events 404, expressed over a long-term period that ends when a most recent value for the level of abuse 320 is calculated. A block 422 compares the long-term accumulated level of abuse 420 to a long-term abuse threshold. If the long-term abuse threshold is exceeded, the block 422 causes the setting of a long-term abuse state flag 424. The list 228 of counters stores a number of instances of setting the long-term abuse state flag 424.

The long-term abuse state flag 424 is also applied to a logical-OR gate 426. When the long-term abuse state flag 424 is set, it forms a sufficient condition to cause the logical-OR gate 426 to set a power limiting flag 428. The ECU 200 uses the power limiting flag 428 to cause a limitation of the power output of the engine 52. This power output limitation may optionally be maintained until the engine 52 is powered off and then powered on again. In an embodiment, the block 422 maintains the long-term abuse state flag 424, when set, until the engine 52 is powered off. In another embodiment, the ECU 200 stores a temporary power limitation flag (not shown) until the engine is powered off.

Returning again to the previous example in which the level of abuse 320 may be in a range of zero (0) to four (4), the long-term abuse state flag 424 may be set and the engine power may be limited when the long-term accumulated level of abuse 420 reveals that the sum of successive abuse levels 320 for the distinct abuse events 404 exceeds a long-term abuse threshold of 20 in a ten-minute period.

The temperature of the drive belt 136, directly or indirectly provided by the drive belt temperature sensor 120, is also monitored. The temperature of the drive belt 136 is applied to a first comparator 430. The first comparator 430 compares the temperature of the drive belt 136 to the first temperature threshold 432 and issues a first high belt temperature flag 434 if the first temperature threshold 432 is exceeded. A visible or audible high drive belt temperature indication is provided on the display cluster 54 when the first high belt temperature flag 434 is set. The list 228 of counters stores a number of instances of setting first high belt temperature flag 434.

The temperature of the drive belt 136 is also applied to a second comparator 436. The second comparator 436 compares the temperature of the drive belt 136 to a second temperature threshold 438, which may or may not be different from the first temperature threshold 432, and issues a second high belt temperature flag 440 if the second temperature threshold 438 is exceeded. The second high belt temperature flag 440 is another input to the logical-OR gate 426 and, when set, becomes another sufficient condition for causing the logical-OR gate 426 to set the power limiting flag 428. As a result, the ECU 200 may cause a limitation of the power output of the engine 52 in case of a high temperature of the drive belt 136, whether or not the long-term abuse state flag 424 is set.

As non-limiting examples, the first temperature threshold for providing the visible or audible high drive belt indication may be 75° C. and the second temperature threshold for causing a limitation of the power output of the engine 52 may be 80° C.

In a non-limiting embodiment, the blocks 402, 406, 408, 412, 416 and 422, the logical-OR gate 426 and the comparators 430 and 438 may be implemented in the ECU 200. In this embodiment, the processor 202 executes machine executable instructions stored in the non-transitory computer-readable medium 220, applies the above-mentioned thresholds obtained from the list 226 of parameters, and stores the various counters in the list 228 of counters.

Figure 7:
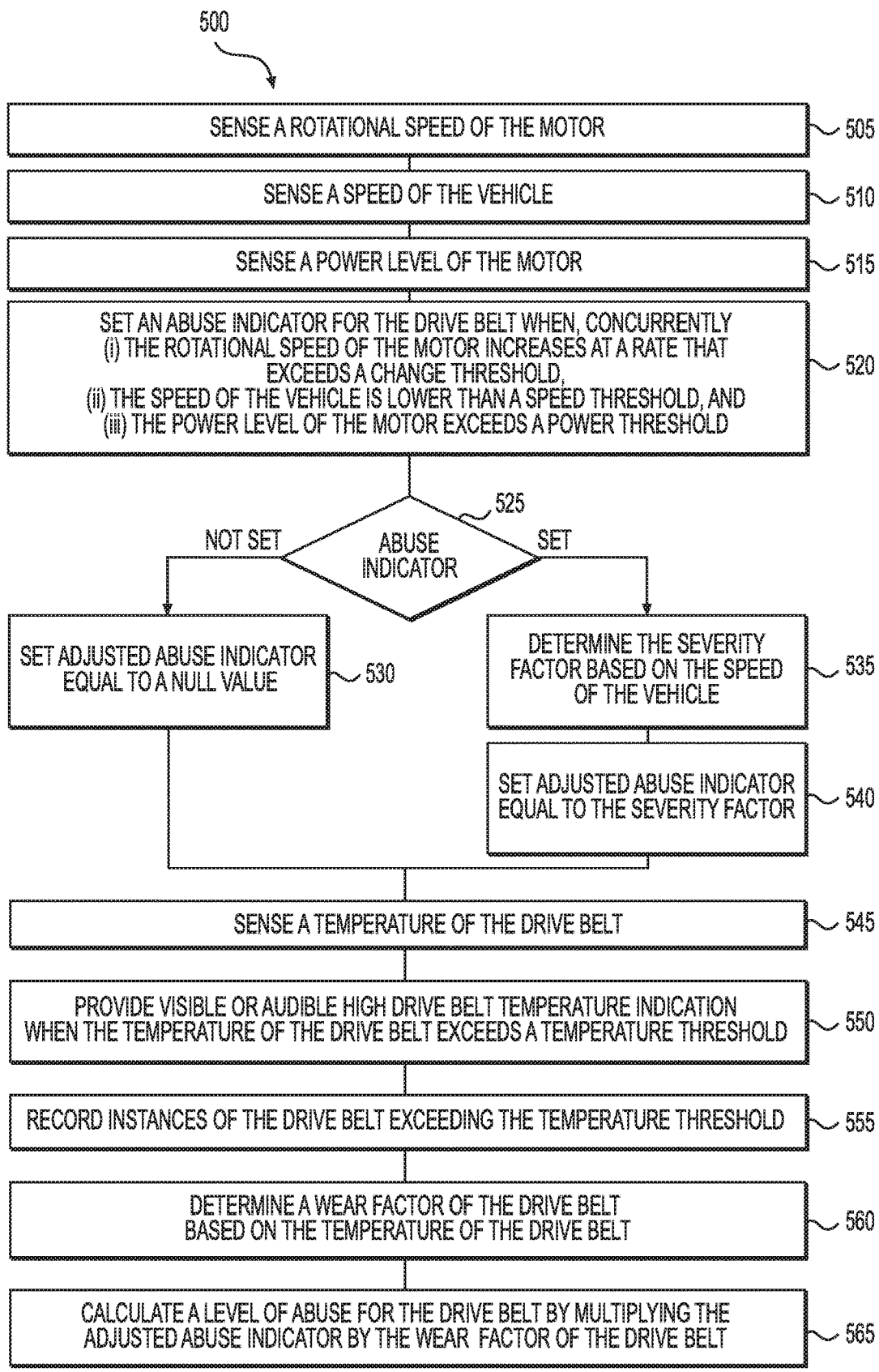
FIG. 7 is a sequence diagram illustrating a method for monitoring the CVT of FIG. 2.

Referring to FIG. 7, a method for monitoring the drive belt 136 of the CVT 58 will now be described. The method may be implemented in large part on the ECU 200 in relation to various devices implemented in the snowmobile 10. To this end, a sequence 500 comprises a plurality of operations, some of which may be executed in variable order, some of the operations possibly being executed concurrently, some of the operations being optional.

At operation 505, a rotational speed of the motor, for example the engine 52, is sensed by the engine speed sensor 210. The speed of the snowmobile 10, or more generally a speed of a vehicle having the CVT 58, may be sensed by the vehicle speed sensor 208 at operation 510. A power level of the motor is also sensed by the engine power parameter sensor 212 at operation 515. At operation 520, the abuse detection block 302 sets the abuse indicator 304 for the drive belt 136 when, concurrently, the rotational speed of the motor increases at a rate that exceeds the change threshold, the power level of the motor exceeds the power threshold and, optionally, the speed of the vehicle is lower than the first speed threshold. Conversely, the abuse indicator 304 for the drive belt 136 is not set when at least one of the above mentioned criteria is not met at operation 520.

In an embodiment, the setting of abuse indicator 304 may be sufficient for the ECU 200 to issue an audible or visible indication to the rider of the snowmobile 10 or to limit the power of the motor. In other embodiments, the following calculations may take place. At operation 525, a test is made to determine whether the abuse indicator 304 is currently set or not set. If the test of operation 525 determines that the abuse indicator 304 is not set, the multiplier 310 sets the adjusted abuse indicator 312 to a null value at operation 530. This null value may be a numerical or logical zero (0) or any equivalent value that is recognized by the processor 202 as an indication that abuse conditions are not present. If the test of operation 525 determines that the abuse indicator 304 is set to anything but the null value, for example being set to a numerical value of one (1), the multiplier 310 multiplies the abuse indicator 304 with the severity factor 308 determined by the severity factor block 306 based on the speed of the vehicle 10 at operation 535. In an embodiment where the severity factor block 306 is implemented in the ECU 200, the processor 202 may consult the map 222 to obtain data about the severity of potential abuse of the drive belt 136 as a function of the speed of the snowmobile 10. The severity factor 308 may have a minimum value when the speed of the vehicle 52 exceeds the first speed threshold and a maximum value when the speed of the vehicle is less than or equal to the second speed threshold, which is lower than the first speed threshold. The multiplier 310 sets the adjusted abuse indicator 312 equal to the severity factor 308 at operation 540, considering that operation 540 is executed while the logical value of the abuse indicator 304 is set. Alternatively, multiplier 310 may calculate the adjusted abuse indicator 312 by multiplying the severity factor 308 by the numerical value of the abuse indicator 304.

Regardless of the state of the abuse indicator 304, operation 545 may comprise the drive belt temperature sensor 120 sensing a temperature of the drive belt 136, which is either a direct measurement of the temperature of the drive belt 136 or an indirect measurement obtained by sensing the ambient temperature within the CVT housing. At operation 550, a visible or audible high drive belt temperature indication is provided on the display cluster 54 when the temperature of the drive belt 136 exceeds the first temperature threshold. Instances of the drive belt 136 exceeding the first temperature threshold may be recorded in the list of counters 228 at operation 555. In an embodiment where the temperature versus wear block 314 is implemented in the ECU 200, the processor 202 may use data about the impact of the temperature of the drive belt 136 on potential wear of the drive belt 136 from the map 224 to determine the wear factor 316 of the drive belt based on the temperature of the drive belt 136 at operation 560. In an embodiment, the wear factor 316 has a minimum value, for example unity, when the temperature of the drive belt 136 is less than or equal to the first temperature threshold. Conversely, when the temperature of the drive belt 136 exceeds the first temperature threshold, the wear factor 316 increases as a function of the temperature of the belt 136, up to a maximum value of the wear factor 316, which is met when the temperature of the drive belt 136 exceeds the second temperature threshold. The level of abuse 320 for the drive belt 136 is calculated at operation 565 by the multiplier 318 that multiplies the adjusted abuse indicator 312 by the wear factor 316 of the drive belt 136. In operation 565, if the abuse indicator 304 is not set (being equal to zero (0) or to a null value), the level of abuse 320 for the drive belt 136 is also set to zero (0). It may be noted that the sequence 500 may be executed repeatedly, once every few milliseconds, to continuously refresh the value of the level of abuse 320.

Figure 8:
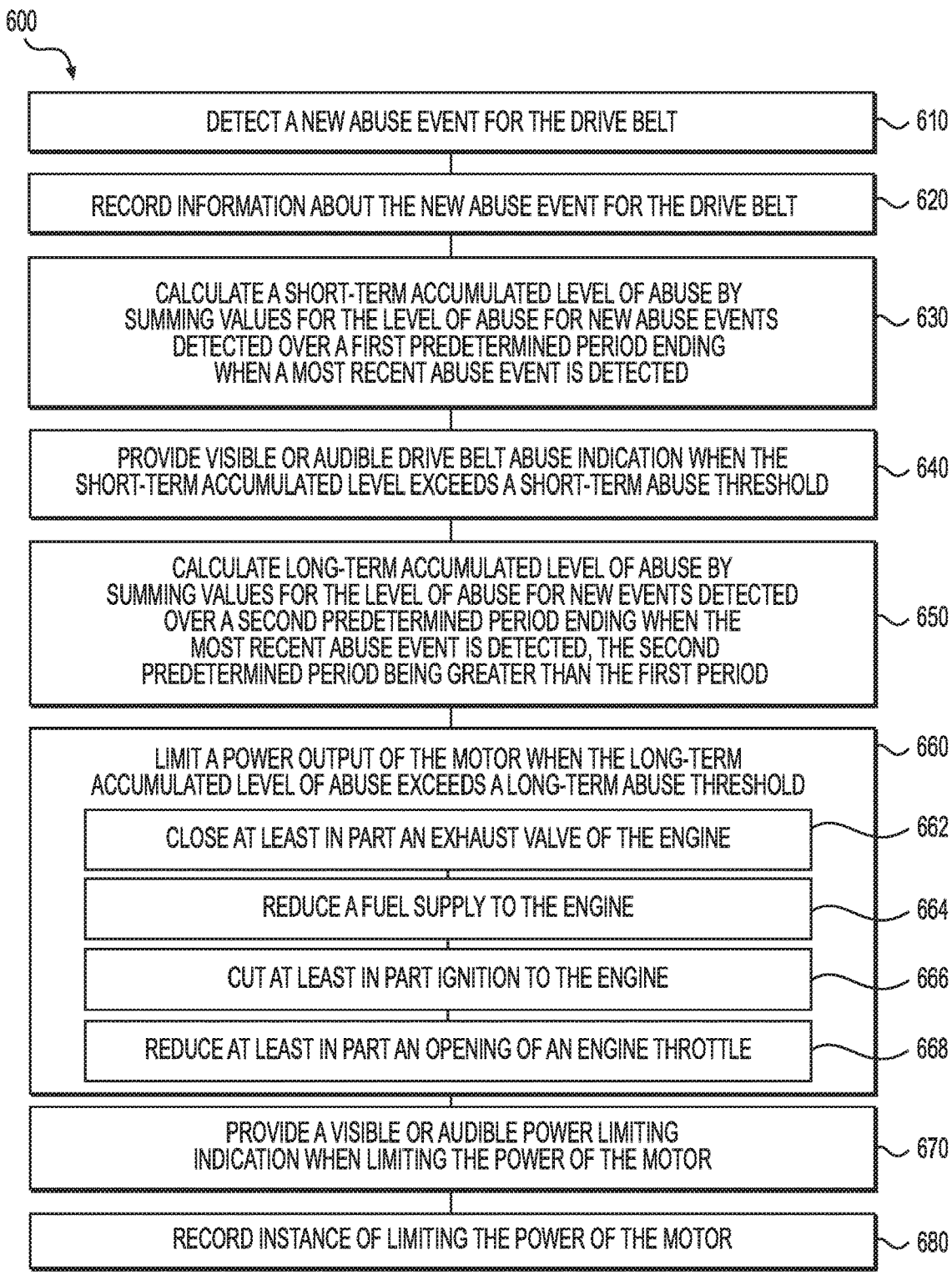
FIG. 8 is a sequence diagram illustrating a method of preventing damage to the CVT of FIG. 2.

Referring to FIG. 8, a method for preventing or at least mitigating and/or delaying damage to the drive belt 136 of the CVT 58 will now be described. The method may be implemented in large part on the ECU 200 in relation to various devices implemented in the snowmobile 10. To this end, a sequence 600 comprises a plurality of operations, some of which may be executed in variable order, some of the operations possibly being executed concurrently, some of the operations being optional.

Operation 610 comprises detecting, by the abuse counter block 402, a new abuse event 404. A new abuse event 404 is deemed to have occurred each time the level of abuse 320 for the drive belt 136, calculated using for example the method illustrated in FIG. 7, rises above zero (0). More generally, the new abuse event 404 may also be deemed to have occurred each time the abuse indicator 304 changes from the null value. A time of occurrence of the new abuse event 404 for the drive belt 136 and the level of abuse 320, if available, are recorded in the list of counters 228 at operation 620. A short-term accumulated level of abuse 410 is calculated by the block 406 at operation 630 by summing values for the level of abuse 320 for new abuse events 404 detected over a first predetermined period ending when a most recent abuse event 404 is detected. A visible or audible drive belt abuse indication may be provided on the display cluster 54 at operation 640 when the block 412 sets the short-term abuse state flag 414, having determined that the short-term accumulated level 410 exceeds a short-term abuse threshold.

At operation 650, a long-term accumulated level of abuse 420 is calculated by the block 408 that sums values for the level of abuse 320 for new abuse events 404 detected over a second predetermined period ending when the most recent abuse event 404 is detected, the second predetermined period being longer than the first period. To prevent, or at least mitigate or delay, damage to the drive belt 136, a power output of the motor is limited at operation 660 when the block 422 sets the long-term abuse state flag 424, having determined that the long-term accumulated level of abuse 420 exceeds a long-term abuse threshold.

When the motor is an internal combustion engine, for example the engine 52, operation 660 may comprise one or more of sub-operations 662, 664, 666 and 668, which are executed in view of limiting the power output of the engine 52. Sub-operation 662 comprises closing at least in part an exhaust valve of the engine 52. Sub-operation 664 comprises reducing a fuel supply to the engine 52. Sub-operation 666 comprises cutting at least in part ignition to the engine 52. Sub-operation 668 comprises reducing at least in part an opening of an engine throttle. Other manners of limiting the power output of the engine 52 may also be contemplated. When the motor is an electric motor, a voltage and/or a current delivered from a battery to the electric motor may be controlled to limit the power output of the electric motor. To this end, an embodiment may use pulse-width modulation to control power delivery to the electric motor.

A visible or audible power limiting indication may be provided on the display cluster 54 at operation 670 when limiting the power of the motor. Instances of limiting the power of the motor may be recorded in the list of counters 228 at operation 680.

In an embodiment, the prevention of damage to the drive belt 136 may rely on the abuse detector 302 setting of the abuse indicator 304 at operation 520 of FIG. 7 (with or without accounting for the speed of the vehicle), without factoring in the severity factor 308 based on the speed of the vehicle and without factoring in the wear factor 316 based on the temperature of the drive belt 136. In this embodiment, a short-term and/or a long-term accumulated level of abuse 410, 420 may be calculated by summing successively recorded values for the abuse indicator 304 over the predetermined period. Operations 660, with its sub-operations, as well as operations 670 and 680 may follow as described hereinabove.

In another embodiment, the prevention of damage to the drive belt 136 may rely on the setting of the abuse indicator 304 (with or without accounting for the speed of the vehicle), factoring in the severity factor 308 based on the speed of the vehicle to obtain values for the adjusted abuse indicator 312 at operation 530 or 540 of FIG. 7, but without factoring in the wear factor 316 based on the temperature of the drive belt. In this embodiment, a short-term and/or a long-term accumulated level of abuse 410, 420 may be calculated by summing successively recorded values for the adjusted abuse indicator 312 over the predetermined period. Operations 660, with its sub-operations, as well as operations 670 and 680 may follow as described hereinabove.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A method for monitoring a drive belt of a continuously variable transmission (CVT) provided in a vehicle having a motor driving the CVT, the method comprising:
sensing a rotational speed of the motor;
sensing a power level of the motor; and
setting an abuse indicator for the drive belt when, concurrently, the rotational speed of the motor increases at a rate that exceeds a change threshold, and the power level of the motor exceeds a power threshold.

2. The method of claim 1, further comprising:
sensing a speed of the vehicle;
wherein the abuse indicator is set when, concurrently, the rotational speed of the motor increases at a rate that exceeds the change threshold, the speed of the vehicle is lower than a speed threshold and the power level of the motor exceeds the power threshold.

3. The method of claim 2, further comprising:
if the abuse indicator is not set, setting an adjusted abuse indicator equal to a null value; and
if the abuse indicator is set:
determining a severity factor based on the speed of the vehicle, and
setting the adjusted abuse indicator equal to the severity factor.

4. The method of claim 3, wherein:
the speed threshold is a first speed threshold;
the severity factor has a minimum value when the speed of the vehicle exceeds the first speed threshold; and
the severity factor has a maximum value when the speed of the vehicle is less than or equal to a second speed threshold lower than the first speed threshold.

5. The method of claim 3, further comprising:
sensing a temperature of the drive belt using a sensor adapted for sensing a surface temperature of the drive belt or using a sensor adapted for sensing an ambient temperature within a housing of the CVT;
determining a wear factor of the drive belt based on the temperature of the drive belt; and
calculating a level of abuse for the drive belt by multiplying the adjusted abuse indicator by the wear factor of the drive belt.

6. The method of claim 5, wherein:
the wear factor has a minimum value when the temperature of the drive belt is less than or equal to a temperature threshold; and
when the temperature of the drive belt exceeds the temperature threshold, the wear factor increases as a function of the temperature of the belt up to a maximum value.

7. The method of claim 6, further comprising providing a visible or audible high drive belt temperature indication when the temperature of the drive belt exceeds the temperature threshold.

8. The method of claim 6, further comprising recording every instance of the drive belt exceeding the temperature threshold.

9. The method of claim 5, further comprising:
detecting a new abuse event for the drive belt;
recording information about the new abuse event for the drive belt; and
calculating a short-term accumulated level of abuse by summing values for the level of abuse for new abuse events detected over a first predetermined period ending when a most recent abuse event is detected.

10. The method of claim 9, further comprising providing a visible or audible drive belt abuse indication when the short-term accumulated level exceeds a short-term abuse threshold.

11. The method of claim 9, further comprising calculating a long-term accumulated level of abuse by summing values for the level of abuse for new abuse events detected over a second predetermined period ending when the most recent abuse event is detected, the second predetermined period being longer than the first period.

12. A method of preventing damage to a drive belt of a continuously variable transmission (CVT) provided in a vehicle having a motor driving the CVT, the method comprising:
monitoring the drive belt using the method of claim 11; and
limiting a power output of the motor when the long-term accumulated level of abuse exceeds a long-term abuse threshold.

13. The method of claim 12, further comprising providing a visible or audible power limiting indication when limiting the power output of the motor.

14. The method of claim 12, wherein:
the motor is an internal combustion engine; and
limiting the power output of the motor comprises performing at least one action selected from closing at least in part an exhaust valve of the engine, reducing a fuel supply to the engine, cutting at least in part ignition to the engine, reducing at least in part an opening of an engine throttle, and a combination thereof.

15. The method of claim 12, further comprising recording each instance when limiting the power output of the motor.

16. A method of preventing damage to a drive belt of a continuously variable transmission (CVT) provided in a vehicle having a motor driving the CVT, the method comprising:
monitoring the drive belt using the method of claim 9; and
limiting a power output of the motor when the short-term accumulated level of abuse exceeds a short-term abuse threshold.

17. The method of claim 1, wherein:
the motor is an internal combustion engine; and
sensing the power level of the motor comprises sensing a position of an exhaust valve of the engine.

18. The method of claim 1, wherein:
the motor is an internal combustion engine; and
sensing the power level of the motor comprises sensing a pressure at an air intake of the engine.

19. The method of claim 1, wherein:
the motor is an internal combustion engine; and
sensing the power level of the engine comprises:
sensing a position of an engine throttle, and
calculating the power level as a function of the position of the engine throttle and of the rotational speed of the engine.

* * * * *